(No Model.)
E. W. VANDUZEN.
LUBRICATOR.
No. 259,345. Patented June 13, 1882.
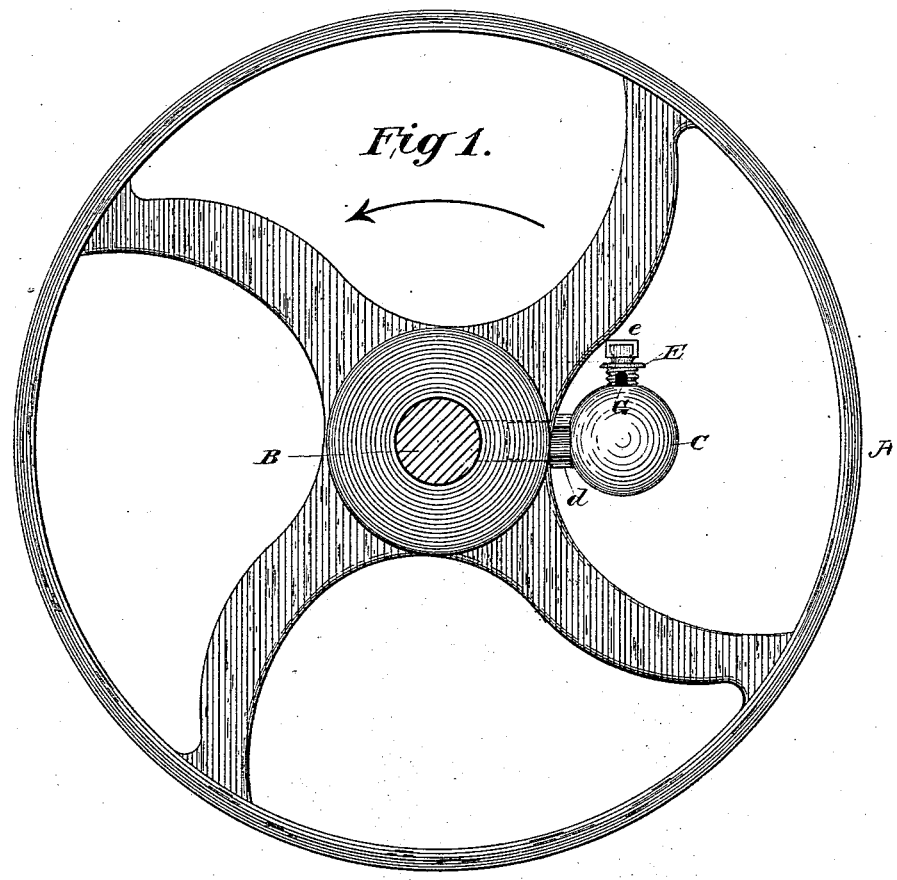
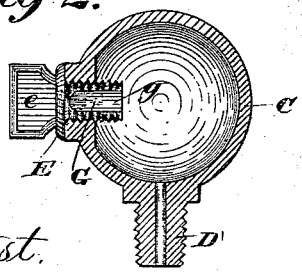
Attest.
Geo. T. Smallwood Jr.
Walter Allen
Inventor
Ezra W. Vanduzen
By Knight Bros
Attys.

UNITED STATES PATENT OFFICE.

EZRA W. VANDUZEN, OF NEWPORT, KENTUCKY.

LUBRICATOR.

SPECIFICATION forming part of Letters Patent No. 259,345, dated June 13, 1882.

Application filed January 7, 1881. (No model.)

*To all whom it may concern:*

Be it known that I, EZRA W. VANDUZEN, of Newport, in the county of Campbell and State of Kentucky, have invented an Improvement in Lubricators for Loose Pulleys, &c.; and I do hereby declare the following to be a full, clear, and exact description of the same, which will enable others skilled in the art to which my invention appertains to make and use it.

My invention relates to that class of lubricators which are provided with a filling-orifice closed by a plug or stopper, and are secured to the hubs of pulleys, wheels, &c.

The object of my invention is to furnish a simple and efficient lubricator at a small cost, consisting of but two members, (the body and its plug,) and one in which a feeding device or feed-regulator is not required.

My improvement consists, first, in combining with a hollow ball or shell having an orifice a plug or stopper having an opening or excavation in its side, by which the lubricating material is supplied to the chamber within the ball or shell, as hereinafter described.

My improvement consists, further, in combining with a hollow ball or shell having a screw-threaded orifice a plug having a screw-threaded hollow shank and a longitudinal filling opening or excavation in its threaded portion, as hereinafter described.

In order that my invention may be fully understood, I will proceed to describe it with reference to the accompanying drawings, in which—

Figure 1 shows my improved lubricator applied to the hub of a loose pulley in position for filling, the plug being partially unscrewed to expose the opening through which the receptacle is replenished with oil. Fig. 2 is a longitudinal section on a larger scale of the lubricator closed and in feeding position, the plug being shown in elevation. Fig. 3 is a perspective view of the plug on a still larger scale.

Similar letters of reference denote like parts in the several figures of the drawings.

A represents a loose pulley, and B a shaft upon which it is mounted.

C is an oil-cup, preferably made of metal in the form of a hollow ball or shell, and provided with a screw-shank, D, (having an oil-duct through it,) by which it is secured to the hub of the pulley. The side of the shell in the direction of the rotation of the pulley (indicated by the arrow, Fig. 1) is formed with an orifice closed by a screw-plug or stopper, E, formed with a thumb-piece, *e*. This plug is hollowed out at its inner end, *g*, and is cut out or excavated at the side to form an opening, G, through which the oil is supplied to the shell when the plug is partly unscrewed, as shown in Fig. 1, the opening G readily admitting the nozzle of the oil-can used in filling. This provision is of very great advantage when the pulley is small or the distance between the hub and pulley arm or rim is so short as to make it inconvenient to entirely remove the plug from the shell. It also obviates the necessity of entirely disconnecting the plug from the shell. Several recesses may be made in the hollow screw, if desired; or the screw may be cast solid and then cut out to form one, two, or more recesses.

With my improved lubricator, which rotates with the pulley or wheel, the body of oil is constantly moving or shifting in the shell, owing to the centrifugal force and the constantly-varying position of the cup, and therefore a small quantity of air is admitted to it through the space between the shaft and pulley at each rotation, and the oil thus permitted to feed slowly to the shaft, the dispensing with the feeding device being a considerable saving in oil and in feeders.

In practice one of my oilers will keep the pulley oiled from two to three weeks with one filling.

In applying the oiler it should be placed near the center of the hub and the shank D screwed in as far as possible. It is desirable to see that the opening G of the filling-plug is applied in the position shown in Fig. 1. In filling the oiler the plug should not be removed. It should be merely screwed out until the opening is exposed sufficiently and is in a convenient position. After filling, the plug should be screwed tight without using an ordinary wrench.

Having thus described my invention, the following is what I claim as new therein and desire to secure by Letters Patent:

1. In combination with a hollow ball or shell, C, the plug E, having an opening or excavation, G, in its side, by which the oil is supplied to the chamber within the ball or shell without removing the plug, as set forth.

2. The combination, with a hollow ball or socket, C, having a screw-threaded orifice, of a plug having a screw-threaded hollow shank and a longitudinal filling opening or excavation, G, in its threaded portion, as set forth.

3. The plug E, formed with thumb-piece $e$, hollow inner end, $g$, and opening G through the shank, in combination with an oil-receptacle, C, as set forth.

The foregoing specification of my invention signed by me this 22d day of December, A. D. 1880.

E. W. VANDUZEN.

Witnesses:
E. A. ELLSWORTH,
A. O. BLAKEMORE.